(12) United States Patent
Koizumi et al.

(10) Patent No.: US 10,199,661 B2
(45) Date of Patent: *Feb. 5, 2019

(54) FUEL CELL SEPARATOR AND MANUFACTURING METHOD OF FUEL CELL SEPARATOR

(71) Applicant: TOYOTA JIDOSHA KABUSHIKI KAISHA, Toyota-shi, Aichi-ken (JP)

(72) Inventors: Masafumi Koizumi, Nagoya (JP); Kotaro Ikeda, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 232 days.

This patent is subject to a terminal disclaimer.

(21) Appl. No.: 15/092,920

(22) Filed: Apr. 7, 2016

(65) Prior Publication Data

US 2016/0301087 A1    Oct. 13, 2016

(30) Foreign Application Priority Data

Apr. 13, 2015   (JP) .................. 2015-081646

(51) Int. Cl.
| H01M 8/0228 | (2016.01) |
| H01M 8/0206 | (2016.01) |
| H01M 8/0213 | (2016.01) |
| H01M 8/0215 | (2016.01) |
| H01M 8/0217 | (2016.01) |

(52) U.S. Cl.
CPC ........ *H01M 8/0228* (2013.01); *H01M 8/0206* (2013.01); *H01M 8/0213* (2013.01); *H01M 8/0217* (2013.01); *Y02P 70/56* (2015.11)

(58) Field of Classification Search
CPC ............. H01M 8/0228; H01M 8/0206; H01M 8/0213; H01M 8/0217; Y02P 70/56
See application file for complete search history.

(56) References Cited

U.S. PATENT DOCUMENTS

| 4,525,381 A | 6/1985 | Tanaka et al. |
| 5,180,571 A | 1/1993 | Hosoya et al. |
| 5,908,671 A * | 6/1999 | Tanaka ................ C23C 8/80 427/122 |
| 7,150,918 B2 | 12/2006 | Brady |
| 2004/0170881 A1 | 9/2004 | Nakata |
| 2005/0191504 A1 | 9/2005 | Brady |
| 2008/0160390 A1 | 7/2008 | Nakata |
| 2009/0130325 A1 | 5/2009 | Hirakuri et al. |
| 2009/0211667 A1 | 8/2009 | Suzuki et al. |
| 2009/0214927 A1 | 8/2009 | Dadheech et al. |
| 2010/0151358 A1 | 6/2010 | Sato et al. |
| 2011/0177430 A1 | 7/2011 | Takahashi et al. |
| 2012/0088185 A1 | 4/2012 | Maeda et al. |
| 2012/0231374 A1 | 9/2012 | Iseki et al. |
| 2013/0302719 A1* | 11/2013 | Takada ................ H01M 8/0206 429/509 |
| 2014/0093639 A1 | 4/2014 | Schlag et al. |
| 2014/0356764 A1 | 12/2014 | Iseki et al. |
| 2015/0171434 A1 | 6/2015 | Suzuki et al. |
| 2016/0087287 A1 | 3/2016 | Koizumi |
| 2016/0281216 A1 | 9/2016 | Shibusawa |

FOREIGN PATENT DOCUMENTS

| CA | 2876276 A1 | 2/2014 |
| CN | 101517799 A | 8/2009 |
| CN | 102054993 A | 5/2011 |
| CN | 104471768 A | 3/2015 |
| DE | 11 2006 002 090 T5 | 6/2008 |
| DE | 10 2009 010 279 A1 | 10/2009 |
| DE | 103 56 653 B4 | 10/2012 |
| DE | 11 2010 004 990 T5 | 3/2013 |
| JP | H11-043770 | 2/1999 |
| JP | 2001-187346 A | 7/2001 |
| JP | 2002-088465 A | 3/2002 |
| JP | 2002-285340 A | 10/2002 |
| JP | 2004-185998 A | 7/2004 |
| JP | 2007-100138 A | 4/2007 |
| JP | 2008-108687 A | 5/2008 |
| JP | 2009-127059 A | 6/2009 |
| JP | 2009-238438 | 10/2009 |
| JP | 2010-135232 A | 6/2010 |
| JP | 2010-218899 A | 9/2010 |
| JP | 2010-248572 A | 11/2010 |
| JP | 2011-162802 A | 8/2011 |
| JP | 4825894 | 11/2011 |
| JP | 2012-026000 A | 2/2012 |
| JP | 2012-104229 | 5/2012 |
| JP | 2013-155406 A | 8/2013 |
| JP | 2015-232937 A | 12/2015 |
| KR | 10-2009-0052886 | 5/2009 |

OTHER PUBLICATIONS

Advisory Action issued in U.S. Appl. No. 14/855,544 dated Sep. 20, 2017.
Office Action issued in U.S. Appl. No. 14/855,544 dated Feb. 23, 2018.
D. Popovic et al., "Practical Sensor for Nitrogen in Direct Current Glow Discharges" Journal of Applied Physics, 102 (2007), pp. 103303-1-103303-7.
Office Action issued in U.S Appl. No. 14/855,544 dated Dec. 22, 2016.
U.S. Appl. No. 14/855,544, filed Sep. 16, 2015.
Final Office Action issued in U.S. Appl. No. 14/855,544 dated Jun. 7, 2017.
Notice of Allowance issued in U.S. Appl. No. 14/855,544 dated Aug. 27, 2018.

* cited by examiner

*Primary Examiner* — Muhammad S Siddiquee
(74) *Attorney, Agent, or Firm* — Finnegan, Henderson, Farabow, Garrett & Dunner, LLP

(57) ABSTRACT

A manufacturing method of a fuel cell separator is provided, whereby the adhesion of a carbon film against a titanium base substrate can be improved and favorable corrosion resistance can be obtained at the same time. A fuel cell separator having such improved adhesion and favorable corrosion resistance is also provided. The method for manufacturing a fuel cell separator according to an embodiment of the invention includes the steps of: forming a TiOx (1<x<2) layer 42 on a titanium base substrate 40; and forming a carbon film 44 on the TiOx layer 42 by plasma CVD so that a binder layer 43 including Ti, O and C is formed between the TiOx layer 42 and the carbon film 44.

4 Claims, 9 Drawing Sheets

FUEL CELL SEPARATOR AND MANUFACTURING METHOD OF FUEL CELL SEPARATOR

BACKGROUND

Field of the Invention

The present invention relates to a fuel cell separator and a manufacturing method of a fuel cell separator.

Description of Related Art

A technique has been developed of using titanium which is highly resistant to corrosion as a base substrate of a fuel cell separator and coating the titanium base substrate with a carbon thin film (carbon film). In this technique, ensuring adhesion between the titanium base substrate and the carbon film is a particularly important issue.

Usually, a surface layer of a titanium member is covered with a naturally-occurring oxide layer, which is a $TiO_2$ layer. Since a $TiO_2$ layer itself is a stable and dense layer, it serves as a protective film providing good corrosion resistance. However, when forming a carbon film on the titanium member, such $TiO_2$ layer may be a factor leading to deterioration of adhesion.

Conventionally, various techniques have been adopted to improve the adhesion between the titanium member and the carbon film. For example, a known method removes the $TiO_2$ layer in a vacuum by means of etching, and another known method forms an intermediate layer of TiC, etc., in advance (see, for example, JP4825894 B). In the method of removing the $TiO_2$ layer by etching, when the carbon film is formed after the $TiO_2$ layer is completely removed, a compound of Ti and C, i.e., TiC or TiCx, is formed on the interface between the titanium member and the carbon film, and such TiC or TiCx serves as an adhesion layer (binder layer). In other words, fuel cell separators formed by such conventional methods have a Ti/TiC/C structure.

SUMMARY

However, TiC, serving as an adhesion layer, is easily oxidized in an environment of a fuel cell and TiC is easily transformed to $TiO_2$. According to potential scanning in the range of −0.2 V to 0.9 V (SHE), which simulates an environment of a fuel cell, a peak has been observed around 0.4 to 0.5 V and this peak corresponds to oxidation of TiC. As can be seen from the above result, a TiC adhesion layer is easily oxidized under a fuel cell environment and its corrosion resistance is poor. A novel method for increasing the adhesion between the titanium base substrate and the carbon film and also improving the corrosion resistance has been demanded.

In view of the above, an object of the present invention is to provide a method for manufacturing a fuel cell separator, whereby the adhesion of a carbon film against a titanium base substrate can be increased and, at the same time, favorable corrosion resistance can be obtained.

In order to achieve the above object, the present invention provides a method for manufacturing a fuel cell separator, including the steps of forming a TiOx (1<x<2) layer on a titanium base substrate and forming a carbon film on the TiOx layer by plasma CVD so that a binder layer including Ti, O and C is formed between the TiOx layer and the carbon film.

According to the present invention, since a TiOx layer is formed on a titanium base substrate and a carbon film is then formed on the TiOx layer by plasma CVD, the TiOx layer binds with the carbon (C) components of the carbon film to form a binder layer including Ti, O and C between the TiO layer and the carbon film. This binder layer provides adhesion between the TiOx layer and the carbon film. In addition, corrosion resistance is ensured by the presence of the TiOx layer.

Preferably, the binder layer is formed so as to have a thickness of 0.1 nm or more and 5 nm or less by controlling the plasma CVD. Such control of the plasma CVD may be performed by adjusting the time of the plasma CVD and the direct current bias voltage applied in the plasma CVD. A thickness of 0.1 nm or more is necessary in order to secure adhesion between the TiOx layer and the carbon film via the binder layer, while a thickness of 5 nm or less is necessary in order to secure the conductivity of the binder layer. The binder layer is gradually oxidized under an oxidative condition, resulting in insulating properties; however, the binder layer, if it is as thin as 5 nm or less, can maintain a certain level of conductivity due to the tunneling effect, etc.

The binder layer may further include, for example, N. If a gas including nitrogen is used in the plasma CVD, the resulting binder layer will include N.

A gas including nitrogen is used as a bombardment gas or a film-forming gas during the plasma CVD process. Through such use, plasma emission arising from nitrogen (N) occurs during the plasma CVD process and the TiOx layer is irradiated with the plasma emission. As a result, the TiOx layer is activated through the photocatalytic effect and the surface free energy of the TiOx layer increases so that the adhesion between the TiOx layer and the carbon film via the binder layer is increased.

In order to achieve the above-mentioned object, the present invention also provides a fuel cell separator comprising: a titanium base substrate; a TiOx (1<x<2) layer formed on the titanium base substrate; a carbon film formed on the TiOx layer; and a binder layer including Ti, O and C formed between the TiOx layer and the carbon film.

According to the present invention, since a carbon film is formed on the TiOx layer by the plasma CVD, the TiOx layer is caused to bind with the carbon (C) component of the carbon film and, as a result, a separator having a binder layer including Ti, O and C formed between the TiOx layer and the carbon film can be obtained. This binder layer ensures adhesion between the TiOx layer and the carbon film. In addition, corrosion resistance can be secured by the presence of the TiOx layer.

The above binder layer has a thickness of 0.1 nm or more and 5 nm or less. A thickness of 0.1 nm or more is necessary in order to secure adhesion between the TiOx layer and the carbon film via the binder layer, while a thickness of 5 nm or less is necessary in order to secure the conductivity of the binder layer. The binder layer is gradually oxidized under an oxidative condition, resulting in insulating properties; however, the binder layer, if it is as thin as 5 nm or less, can maintain a certain level of conductivity due to the tunneling effect, etc.

The binder layer may further include N. If a gas including nitrogen is used in the plasma CVD, the resulting binder layer will include N. For example, a gas including nitrogen is used as a bombardment gas or a film-forming gas during the plasma CVD process. Through such use, plasma emission arising from nitrogen (N) occurs during the plasma CVD process and the TiOx layer is irradiated with the plasma emission. As a result, the TiOx layer is activated through the photocatalytic effect and the surface free energy of the TiOx layer increases, so that the adhesion between the TiOx layer and the carbon film via the binder layer is increased.

According to the present invention, a fuel cell separator with increased adhesion of a carbon film against a titanium base substrate and having favorable corrosion resistance can be manufactured.

DETAILED DESCRIPTION OF PREFERRED EMBODIMENTS

Hereinafter, the configuration of the present invention will be described in detail based on the embodiments of the present invention shown in the attached drawings. By way of example only, the below description explains the cases where the present invention is applied to a fuel cell which is intended to be installed in a fuel cell vehicle or where the present invention is applied to a fuel cell system including such fuel cell. However, the scope of the application of the present invention is not limited to such examples.

Figure 1:
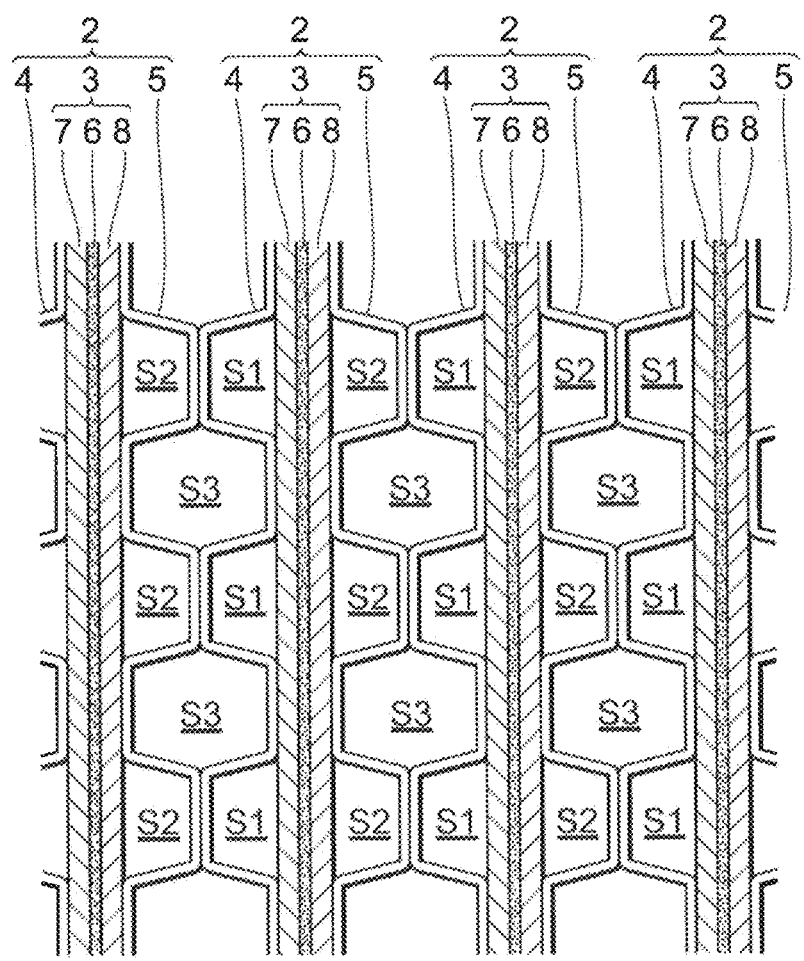
FIG. 1 is a cross-sectional view of the major part of a fuel cell stack including separators.

FIG. 1 is a cross-sectional view of the major part of a fuel cell stack. As shown in FIG. 1, the fuel cell stack has a plurality of stacked cells (unit cells) 2 each acting as a basic unit. The cell 2 includes a membrane-electrode assembly (MEA) 3 and a pair of separators 4 and 5 which sandwich the MEA 3. The MEA 3 has an electrolyte membrane 6 formed of an ion-exchange membrane and a pair of electrodes 7 and 8 which sandwich the electrolyte membrane 6. One electrode 7 is an anode through which a fuel gas (e.g., hydrogen gas) passes and the other electrode 8 is a cathode through which an oxidant gas (e.g., air) passes.

Both separators 4 and 5 are formed in a waved shape. Specifically, in the separators 4 and 5, each wave is in the shape of an isosceles trapezoid and the top part of the wave is formed flat so that each end of the flat top part forms a corner having the same angle. In other words, each separator 4, 5 has almost the same shape when seen from the front and from the back. One electrode 7 of the MEA 3 is in surface-to-surface contact with the top part of the separator 4, while the other electrode 8 of the MEA 3 is in surface-to-surface contact with the top part of the separator 5.

A space S1 defined between the electrode 7 and the separator 4 serves as a flow path through which a fuel gas flows. A space S2 defined between the other electrode 8 and the separator 5 serves as a flow path through which an oxidant gas flows.

Furthermore, the cells 2 are arranged such that the anode of one cell 2 faces the cathode of another cell 2 adjacent to the cell 2, and the separator 4 disposed along the anode (i.e., the electrode 7) of the one cell 2 and the separator 5 disposed along the cathode (i.e., the electrode 8) of the adjacent cell 2 are arranged such that the top part on the backside of the separator 4 is in surface-to-surface contact with the top part on the backside of the separator 5. Water acting as a coolant for cooling the cells 2 flows through a space S3 defined by the separators 4 and 5 which are in surface-to-surface contact with each other between the mutually adjacent cells 2.

First Embodiment

Figure 2:
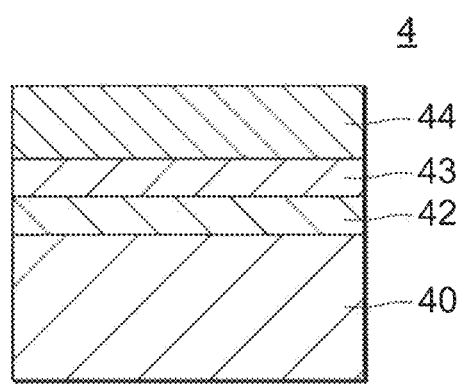
FIG. 2 is an enlarged cross-sectional view of a fuel cell separator according to a first embodiment.

FIG. 2 is an enlarged cross-sectional view of the separator 4. It should be noted that the cross-section of the separator 5 is the same as that of the separator 4. As shown in FIG. 2, the separator 4 has a titanium base substrate 40, a TiOx (1<x<2) layer 42 formed on the titanium base substrate 40, a carbon film 44 formed on the TiOx layer 42 by plasma CVD and a binder layer 43 including Ti, O and C formed between the TiOx layer 42 and the carbon film 44.

The titanium base substrate 40 is made of Ti. The thickness thereof is not particularly limited and it may be, for example, 100 μm to 20,000 μm.

The TiOx (1<x<2) layer 42 is a coating layer formed on the surface layer of Ti and having relatively good corrosion resistance. Due to the presence of TiOx, the separator does not show a particular peak in the potential scanning test simulating a fuel cell environment, and favorable corrosion resistance can be obtained. Furthermore, since the TiOx layer 42 is deficient in oxygen, the TiOx layer 42 has high conductivity. As a result, the TiOx layer 42 does not greatly increase the electrical resistance of the separator in its thickness direction. The thickness of the TiOx layer 42 is not particularly limited and it may be, for example, 2 nm to 50 nm and preferably 5 nm to 10 nm.

The binder layer 43 contains Ti, O and C and binds the TiOx (1<x<2) layer 42 and the carbon film 44 with each other. The binder layer 43 may contain N. Such N in the binder layer 43 is derived from the N components contained in the carbon film 44 or from N components used in the plasma CVD process, which will be described later. As will be explained later, the binder layer 43 is a layer involved between the TiOx layer 42 and the carbon film 43 upon formation of the carbon film 44 on the TiOx layer 42 by the plasma CVD. The binder layer 43 is composed of Ti, O and C (and N) which are bound with each other.

The thickness of the binder layer 43 is preferably 0.1 nm or more and 5 nm or less. The thickness needs to be 0.1 nm or more in order to secure the adhesion between the TiOx layer 42 and the carbon film 44 via the binder layer 43. The thickness needs to be 5 nm or less in order to secure the conductivity of the binder layer 43. The binder layer 43 is gradually oxidized under an oxidative condition, resulting in insulating properties. However, if the binder layer 43 is as thin as 5 nm or less, a certain level of conductivity can be ensured due to the tunneling effect, etc.

The carbon film 44 is formed by plasma CVD. The thickness of the carbon film 44 is not particularly limited and it may be, for example, 10 nm to 1,000 nm. The carbon film 44 may have an amorphous structure or a crystalline structure (graphite structure). The carbon film 44 may contain N. If a gas including nitrogen is used as a bombardment gas or a film-forming gas during the plasma CVD process, N will be incorporated into the carbon film 44.

Next, the manufacturing method of the separator 4 will be described.

Steps for Manufacturing Separator 4

Figure 3:
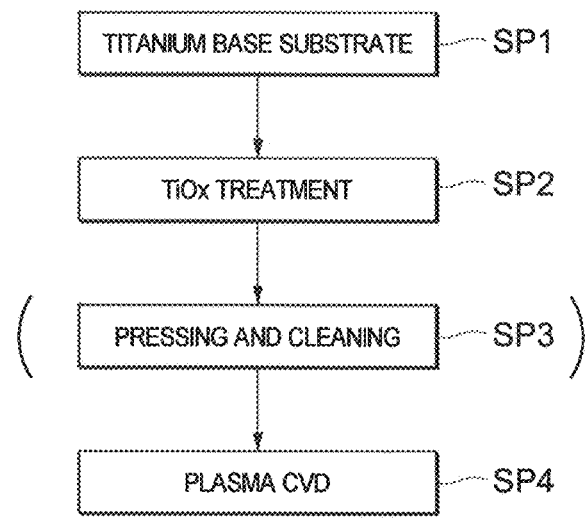
FIG. 3 is a flowchart showing the outline of the steps for manufacturing a separator.

FIG. 3 is an overview flowchart showing the steps for manufacturing the separator 4. For the titanium base substrate that constitutes the separator 4, for example, a bright-annealed material (BA material) or an acid-pickled material can be used (step SP1). It has been confirmed that an acid-pickled material has, on its surface layer, an oxide layer formed of a titanium oxide ($TiO_2$) layer.

First, TiOx treatment is applied onto the titanium base substrate 40 so as to form a TiOx layer 42 (step SP2). There are several methods available for obtaining a TiOx layer 42. For example, a method which forms a TiOx layer by dissolving the titanium surface with concentrated sulfuric acid and a method which forms a TiOx layer utilizing a sol-gel process can be employed. In addition, if a titanium oxide layer is present on the surface of the titanium base substrate 40, a method which reduces the titanium oxide layer through plasma treatment using a reducing substance, such as hydrogen, may be used.

Next, the titanium base substrate 40 is pressed as required, and cleaned (step SP3). It should be noted here that such pressing and cleaning steps may be omitted. Further, at least one of the pressing step and the cleaning step may be performed before the TiOx treatment (step SP2).

After cleaning, plasma CVD (plasma-enhanced chemical vapor deposition) is performed so as to form a carbon film 44 on the TiOx layer 42 which has been formed on the surface of the titanium base substrate 40.

Plasma CVD Process

Figure 4:
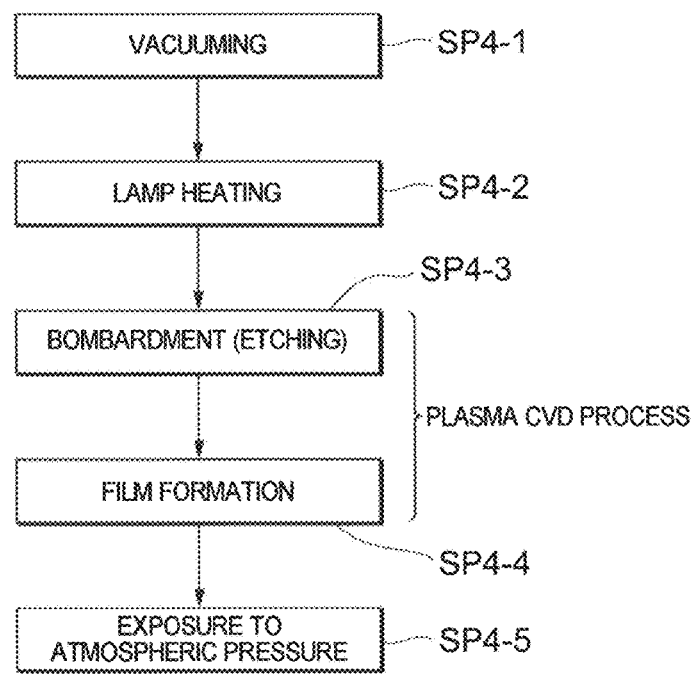
FIG. 4 is a flowchart showing the details of a plasma CVD process.

The details of the plasma CVD will be described next (see FIG. 4). In the plasma CVD process, first, the titanium base substrate 40 on which the TiOx layer 42 has been formed is placed in a vacuum atmosphere by way of vacuuming using a vacuum apparatus (step SP4-1). The titanium base substrate 40 is then heated from the outside by way of heating with a lamp (heating with the heat of a lamp; this is an example of simple heating means) to the desired temperature, for example, about 300° C., so as to remove oily substances remaining on the surface (step SP4-2).

Next, as a pre-treatment, bombardment (etching) is performed, if necessary (step SP4-3). Bombardment etching generally means an etching process using plasma and more specifically means a process of removing contaminants (oxides) by physically colliding atoms in a plasma state. The effect of such bombardment can be increased when using argon. In the present embodiment, a gas including nitrogen is preferably used as a bombardment gas and, for example, a gas mixture of argon and nitrogen can be used. When the TiOx layer 42 is irradiated with light from nitrogen plasma during bombardment etching, the TiOx layer 42 is further activated through the photocatalytic effect and the surface free energy of the TiOx layer 42 is increased. It should be noted that the TiOx layer 42 will not be removed during the bombardment (etching) if it is performed on the second time scale (e.g., for several seconds to ten seconds).

The reason that the TiOx layer 42 is activated through the photocatalytic effect upon irradiation with nitrogen plasma light is as follows. In general, there are three types of titanium oxide ($TiO_2$) and, of these three types, one of the two major types is in a rutile form (stable; a majority of titanium oxide is in this rutile form) and the other is in an anatase form. The photocatalytic effect occurs only in the presence of electrons and positive holes generated in an excited state. Since the necessary energy for such excitation is 3.0 eV for the rutile form and 3.2 eV for the anatase form, the rutile form and the anatase form are, in theory, excited by being irradiated with light of 410 nm or less and 390 nm or less, respectively. The TiOx layer is formed by placing $TiO_2$ in the rutile or anatase form in an oxygen-deficient condition, and the necessary energy for excitation of such TiOx layer is assumed to have little difference from that for $TiO_2$. Since the emission peak of nitrogen ($N_2$) plasma is at 410 nm or less, the activation of the TiOx layer 42 can be facilitated through the photocatalytic effect, regardless of whether the TiOx layer 42 corresponds to the rutile form in an oxygen-deficient condition or the anatase form in an oxygen-deficient condition, and the surface free energy on the TiOx layer 42 can be increased.

Next, a carbon film 44 is formed on the surface of the TiOx layer 42. (step SP4-4). The carbon film 44 is formed by using a hydrocarbon-based gas (e.g. acetylene) as the base of the film-forming gas. In the present embodiment, it is preferable to use a gas including nitrogen as the film-forming gas and, for example, a gas including acetylene and nitrogen is used. Through such use, light arising from a nitrogen plasma (which is light with a wavelength of 390 nm or less) is applied to the surface of the TiOx layer 42 during the formation of the carbon film 44. As a result, for the reason described above, the TiOx layer 42 is further activated by the photocatalytic effect and the surface free energy of the TiOx layer 42 is increased.

According to the above-described plasma CVD process, the TiOx layer 42, which is an active layer, is formed on the titanium base substrate 40 and, due to this active TiOx layer 42, the adhesion between the TiOx layer 42 and the carbon film 44 to be formed thereon can be increased. The TiOx layer 42 easily binds or reacts with C and, after the formation of the carbon film 44, a binder layer 43 including Ti, O and C is formed between the TiOx layer 42 and the carbon film 44. The adhesion between the TiOx layer 42 and the carbon film 44 can be ensured by way of this binder layer 43. The binder layer 43 is a layer composed of Ti, O and C (and N) which are bound with each other. The thickness of the binder layer 43 is preferably 0.1 nm or more and 5 nm or less. The binder layer 43 may further include N. Such N contained in the binder layer 43 is derived from the N components contained in the carbon film 44 or derived from nitrogen gas used before or during the film formation by plasma CVD.

Now, the reason why plasma CVD is preferable to form the carbon film 44 on the TiOx layer 42 will be described. Although the TiOx layer 42 is an active layer, there are no dangling bonds in the surface of the TiOx layer 42. When the TiOx layer 42 is exposed to a plasma during the plasma CVD, bonds in the surface layer of the TiOx layer 42 are broken due to radicals generated by the plasma and the TiOx layer 42 therefore has dangling bonds in the surface thereof. Meanwhile, the C included in the film-forming gas also has dangling bonds, since the film-forming gas is a plasma. Accordingly, in the plasma CVD, not only the C in the film-forming gas but also the surface layer of the TiOx layer 42 are caused to have dangling bonds and, thus, the C is bound with and deposited on the TiOx layer. CVD processes other than plasma CVD and other methods such as PVD cannot induce dangling bonds on the surface of the TiOx layer 42 and cannot form a binder layer 43 between the TiOx layer 42 and the carbon film 44. Thus, the adhesion strength between the TiOx layer 42 and the carbon film 44 cannot be enhanced.

After the film formation treatment, the resulting substrate is exposed to the atmospheric pressure (step SP4-5). The above-described embodiment is a preferred example of carrying out the present invention, but the present invention is not limited to such example and may be modified in various ways without departing from the gist of the present invention. For example, the bombardment gas may include only argon so that the binder layer 43 will be a layer composed of Ti, O and C.

Second Embodiment

Figure 5:
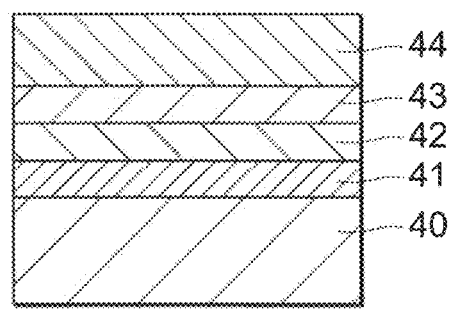
FIG. 5 is an enlarged cross-sectional view of a fuel cell separator according to a second embodiment.

FIG. 5 is an enlarged cross-sectional view of a separator according to a second embodiment. As shown in FIG. 5, the separator of the second embodiment has a $TiO_2$ layer 41 formed on the titanium base substrate 40, and the TiOx layer 42 is formed on such $TiO_2$ layer 41 and, in this respect, the separator of the second embodiment is different from the first embodiment in which the TiOx layer 42 is formed directly on the titanium base substrate 40. Other than the above, the second embodiment is the same as the first embodiment and the description of the same parts will be omitted here.

As described before, an oxide layer formed of a $TiO_2$ layer is normally formed on the titanium base substrate 40. In the second embodiment, such oxide layer is not removed but is left remaining as a $TiO_2$ layer 41.

The manufacturing method of the separator of the second embodiment is different from the manufacturing method of the separator of the first embodiment in steps SP1 and SP2. In the second embodiment, a titanium base substrate having a $TiO_2$ layer 41 formed on the surface thereof is used (step SP1). In the TiOx treatment, only part of the surface layer of the $TiO_2$ layer 41 is transformed to TiOx. Alternatively, a layer of TiOx may be formed on the $TiO_2$ layer 41. For example, a method of reducing only part of the surface layer of the $TiO_2$ layer 41 to form a TiOx layer and a method of forming a TiOx layer on the $TiO_2$ layer 41 utilizing a sol-gel process may be used to manufacture the separator of the second embodiment.

Various tests for confirming the effect of the manufacturing method of the separator according to the above-described embodiments were conducted. The separators of Examples 1 and 2 will now be described below.

Example 1

A bright-annealed titanium plate was prepared and cut into a piece about 200×400 mm in size to be used as a titanium base substrate 40 (step SP1). Here, bright annealing treatment is a process of burning the titanium plate under a non-oxygen atmosphere, whereby a titanium base substrate 40 having a metal surface of Ti can be obtained. The obtained titanium base substrate 40 was pressed so as to be in the form of a separator, and then cleaned with a hydrocarbon-based cleaning solution and an alkaline cleaning solution (step SP3). After that, acid-pickling treatment was performed with a 50% $H_2SO_4$ aqueous solution and the resulting substrate was dried in a vacuum drying oven at 300° C., to thereby form a TiOx layer 42 on the surface of the titanium base substrate 40 (step SP2).

Subsequently, a carbon film 44 was formed by plasma CVD (step SP4). In the plasma CVD, the titanium base substrate 40 was transferred into a deposition chamber at a temperature of 300° C. and a pressure of 10 Pa, and a direct current bias voltage of 2.0 kV was then applied so that a glow discharge plasma was generated between the titanium base substrate 40 and the anode. The anode was placed in a manner such that the anode and the titanium base substrate 40 were arranged parallel and facing each other, and a plasma was caused to be simultaneously generated on the respective surfaces. In addition, for the purpose of increasing the plasma density, a samarium cobalt magnet was placed within the chamber so as to trap electrons generated by the plasma.

In the plasma CVD process, the bombardment step and the film formation step were performed in this order and both steps were conducted under a pressure controlled to 10 Pa. An automatic pressure controller (APC) was used for such pressure control. An argon-based, nitrogen-containing gas was used as a bombardment gas, and a hydrocarbon-based, nitrogen-containing gas was used as a film-forming gas. With the plasma CVD process described above, a carbon film 44 having a thickness of 50 nm was formed.

Figure 6:
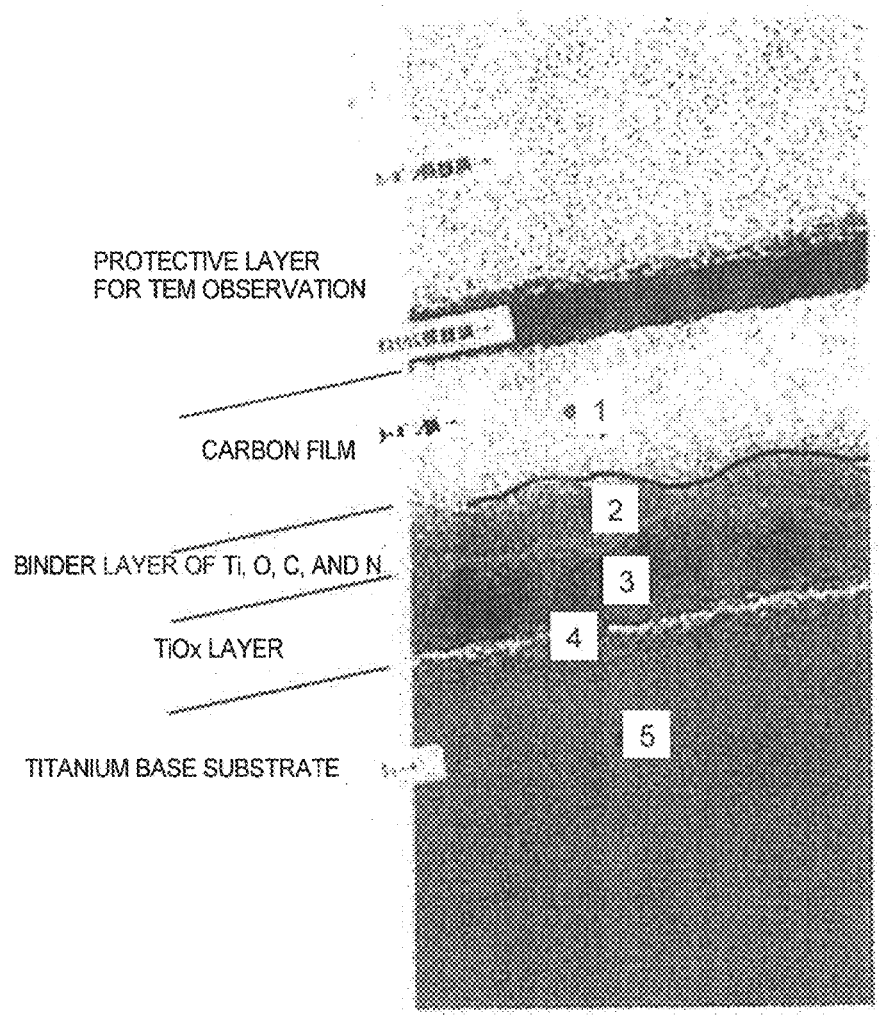
FIG. 6 is a cross-sectional TEM image of a fuel cell separator of Example 1.
Figure 7:
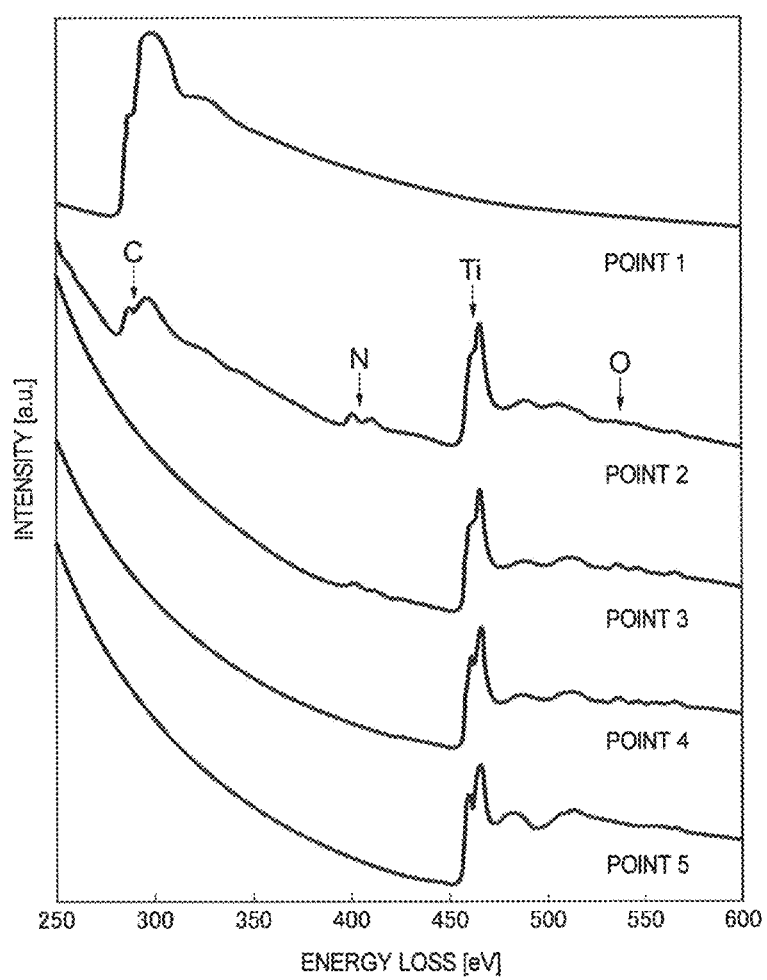
FIG. 7 is a chart showing the result of TEM-EELS analysis of the fuel cell separator of Example 1.

FIG. 6 is a cross-sectional TEM image of the separator of Example 1. FIG. 7 is a chart showing the result of TEM-EELS analysis at points 1 to 5 in the cross-sectional TEM image shown in FIG. 6.

As can be seen from FIGS. 6 and 7, it was observed that, according to the manufacturing method of Example 1, a binder layer 43 containing Ti, O, N and C was formed between the TiOx layer 42 and the carbon film (carbon thin film) 44.

Example 2

An acid-pickled titanium plate was prepared and cut into a piece about 200×400 mm in size to be used as a titanium base substrate 40 (step SP1). Here, it was confirmed that an amorphous $TiO_2$ layer 41 was formed on the surface of the prepared titanium base substrate 40. Acid pickling means a process of etching a surface typically in nitric hydrofluoric acid after a cold-rolling step. The obtained titanium base substrate 40 was pressed so as to be in the form of a separator, and then cleaned with a hydrocarbon-based cleaning solution and an alkaline cleaning solution (step SP3). After that, using a microwave plasma apparatus, the titanium base substrate 40 was treated in a vacuum for two minutes using $H_2$ gas as a reactant gas and Ar gas as a carrier gas under the conditions of 50 Pa and 1.5 kW (TiOx treatment). As a result, the surface layer of the $TiO_2$ layer 41 was reduced so as to form a TiOx layer 42. After that, a carbon film 44 was formed by plasma CVD in the same manner as in Example 1 (step SP4). In the plasma CVD, the applied voltage was 2.0 kV and glow discharge was caused with a direct current bias. The bombardment gas and the film-forming gas used in the plasma CVD included nitrogen.

It was observed that, also according to the manufacturing method of Example 2, a binder layer 43 containing Ti, O, N and C was formed between the TiOx layer 42 and the carbon film (carbon thin film) 44.

Before explaining the effects of the separators of Examples 1 and 2, the separators of Comparative Examples 1 and 2 will firstly be described below.

Comparative Example 1

Figure 8:
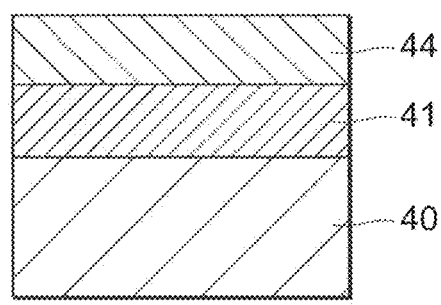
FIG. 8 is an enlarged cross-sectional view of a fuel cell separator of Comparative Example 1.

FIG. 8 is an enlarged cross-sectional view of a separator of Comparative Example 1. In the separator of Comparative Example 1, a $TiO_2$ layer 41 was formed on a titanium base substrate 40 and a carbon film 44 was formed on such $TiO_2$ layer 41. The separator of Comparative Example 1 was manufactured in accordance with an ordinary method. Specifically, the separator of Comparative Example 1 was manufactured by forming the carbon film 44 on the acid-pickled titanium base substrate 40.

Comparative Example 2

Figure 9:
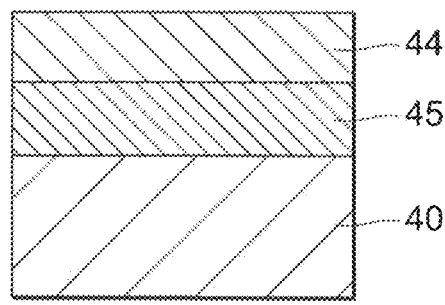
FIG. 9 is an enlarged cross-sectional view of a fuel cell separator of Comparative Example 2.

FIG. 9 is an enlarged cross-sectional view of a separator of Comparative Example 2. In the separator of Comparative Example 2, a TiC layer 45 was formed on a titanium base substrate 40 and a carbon film 44 was formed on such TiC layer 45. The separator of Comparative Example 2 was manufactured in accordance with an ordinary method. Specifically, the separator of Comparative Example 2 was manufactured by forming the carbon film 44 on the bright-annealed titanium base substrate 40.

Evaluation Test 1

The separators of Example 1 and Comparative Examples 1 and 2 were evaluated in terms of adhesion, contact resistance and corrosion resistance. The details of each evaluation test were as follows.

Adhesion Test

Each separator was cut into a 100 mm×50 mm test piece. A peel test was performed for each test piece using a pressure cooker (manufactured by Hirayama Manufacturing Corporation). In this test, the test piece was exposed to pure water vapor so as to accelerate peeling. The test was performed by exposing the test piece to saturated water vapor at 130° C., leaving it in that state for one hour and then cooling and removing the resulting test piece from the pressure cooker.

The evaluation of the peel test was performed by observing the peeling level of the surface of each test piece with a scanning electron microscope (SEM). The test pieces were ranked according to the ratio of the peeled area. The ratio of the peeled area in the SEM observation was obtained by rough calculation based on visual observation. The evaluation criteria of the adhesion test were as follows:

A: Peeled-area ratio of 1% or less

B: Peeled-area ratio of more than 1% but 5% or less

Contact Resistance Test

Carbon paper (thickness: 0.5 mm) corresponding to a diffusion layer of a fuel cell was placed on the surface of the carbon film of each test piece, and measurement was performed while applying a specific load (1 MPa) using a measurement jig. Under the above conditions, the current flowing from the power supply was adjusted so that the current through the test piece was measured by an ammeter to be one ampere, and then, the voltage applied to the test piece was measured by a voltmeter so as to calculate the contact resistance of the carbon film and the carbon paper. In order to obtain only the contact resistance of the carbon film and the carbon paper, the other surface of the titanium base substrate 40 (the surface on which no film was formed) was brought into contact with a stainless steel member having a thick film (1 μm) of Au plating, so that no contact resistance was caused between these members. The evaluation criteria of the contact resistance test were as follows.

A: 5 mΩ·cm² or less

B: More than 5 mΩ·cm² but 10 mΩ·cm² or less

Corrosion Resistance Test

Potential scanning was performed in the range of −0.2 V to 0.9 V (SHE) which simulated a fuel cell environment, and whether or not each test piece had an oxidation peak was observed. In the corrosion resistance test, evaluation was performed according to the following criteria.

A: No oxidation peak observed

B: Oxidation peak observed

Table 1 shows the results of the adhesion test, contact resistance test and corrosion resistance test for the separators of Example 1 and Comparative Examples 1 and 2.

TABLE 1

|  | Comparative Example 1 | Comparative Example 2 | Example 1 |
|---|---|---|---|
| Adhesion Pressure cooker test at 130° C. for one hour | B Peeled-area ratio: 5% | A Peeled-area ratio: 1% | A Peeled-area ratio: 0.5% |
| Contact resistance Measured against carbon paper with a load of 1 MPa | B 10 mΩ · cm² | A 5 mΩ · cm² | A 5 mΩ · cm² |
| Corrosion resistance Presence/absence of oxidation peak in the range of −0.2 to 0.9 V (SHE) | A No oxidation peak observed | B TiC peak observed around 0.3 to 0.6 V | A No oxidation peak observed |

As can be seen from Table 1, the separator of Example 1 exhibited favorable results in the adhesion test, the contact resistance test and the corrosion resistance test, as compared to the separators of Comparative Examples 1 and 2. It was accordingly confirmed that the separator of Example 1, as a result of having a binder layer 43 formed between the TiOx layer 42 and the carbon film 44, had improved adhesion of the carbon film 44 against the titanium base substrate 40 and also had favorable corrosion resistance to be used as a fuel cell separator.

Evaluation Test 2

In Evaluation Test 2, the adhesion test, contact resistance test and corrosion resistance test were performed for separators having a binder layer 43 of a different thickness. More specifically, by controlling the plasma CVD for forming the carbon film 44, samples having a binder layer 43 of 1 nm or less, 5 nm and 15 nm, respectively, were prepared. For such control of the plasma CVD, the time of the plasma CVD and the direct current bias voltage applied in the plasma CVD were adjusted. In the same manner as that described in Example 1, a binder layer 43 was identified according to the cross-sectional TEM image and the results of TEM-EELS analysis of the prepared separator, and the thickness of the identified binder layer was determined based on the cross-sectional TEM image.

Each test piece was evaluated in terms of initial resistance, resistance after the corrosion test and change of the binding state after the corrosion test. The details of each evaluation test were as follows.

Initial Resistance Test

In the initial resistance test, contact resistance was measured for each test piece. Here, the measurement of the contact resistance was performed in the same way as in the contact resistance test in Evaluation Test 1.

Corrosion Test (Corrosion-Resistance Test)

A corrosion test (a constant-potential corrosion test) was performed for each test piece in accordance with the method of the electrochemical high-temperature corrosion test for metallic materials prescribed in the Japanese Industrial Standards (JIS Z2294). In an apparatus exposed to atmospheric pressure, a test piece, the temperature of which was regulated to 80° C. using temperature regulation water, was immersed in a sulfuric acid solution (300 ml, pH 3). In that state, the test piece (sample electrode) was electrically connected with a counter electrode made of a platinum plate so as to generate a potential difference of 0.9 V between the counter electrode and the sample electrode and so as to thereby cause the test piece to corrode. During the test, the potential of the test piece was kept constant by a reference electrode. The period of the test was about 50 hours.

The contact resistance was measured after the constant-potential corrosion test. The measurement of the contact resistance was performed in the same manner as in the contact resistance test in Evaluation Test 1. Furthermore, the change of the binding state of the binder layer 43 after the corrosion test was observed through TEM-EELS analysis.

Table 2 shows the measurement results of the initial resistance test and the corrosion test (contact resistance measured) for three types of separators each having a binder layer 43 of a different thickness. The criteria for the overall evaluation in Table 2 were as follows.

A: Contact resistance of 5 m$\Omega \cdot$cm$^2$ or less both before and after the corrosion test.

B: Contact resistance of more than 5 m$\Omega \cdot$cm$^2$ after the corrosion test.

TABLE 2

| Thickness of binder layer | Initial resistance against carbon paper | Resistance after corrosion test (0.9 V, pH 3, 80° C.) against carbon paper | Evaluation |
| --- | --- | --- | --- |
| 1 nm or less | 4 m$\Omega \cdot$ cm$^2$ | 4 m$\Omega \cdot$ cm$^2$ | A |
| 5 nm | 4 m$\Omega \cdot$ cm$^2$ | 5 m$\Omega \cdot$ cm$^2$ | A |
| 15 nm | 4 m$\Omega \cdot$ cm$^2$ | 46 m$\Omega \cdot$ cm$^2$ | B |

As can be seen from Table 2, it has been found that, from the viewpoints of conductivity and corrosion resistance of the binder layer, it is preferable for the binder layer 43 formed between the TiOx layer 42 and the carbon film 44 to have a thickness of 1 nm or more and 5 nm or less. Here, the TEM-EELS analysis has shown that C-bonds decrease and O-bonds increase in such binder layer 43 after the corrosion test. In other words, it has been shown that the binder layer 43 is gradually oxidized under an oxidative condition to accordingly have insulating properties. However, the binder layer 43, if it is as thin as 5 nm or less, can maintain a certain level of conductivity due to the tunneling effect, etc.

The present invention is suitably applied to the manufacture of a separator through the process of forming a carbon film on a titanium base substrate.

What is claimed is:

1. A method for manufacturing a fuel cell separator comprising the steps of:
   forming a TiOx (1<x<2) layer on a titanium base substrate; and
   forming a carbon film on the TiOx layer by plasma CVD, so that a binder layer including Ti, O and C is formed between the TiOx layer and the carbon film.

2. The fuel cell separator manufacturing method according to claim 1, wherein the plasma CVD is controlled so that the binder layer has a thickness of 0.1 nm or more and 5 nm or less.

3. The fuel cell separator manufacturing method according to claim 1, wherein the binder layer further includes N.

4. The fuel cell separator manufacturing method according to claim 1, wherein a gas including nitrogen is used as a bombardment gas or a film-forming gas in the process of the plasma CVD.

* * * * *